United States Patent [19]

Jamieson

[11] Patent Number: 4,665,334

[45] Date of Patent: May 12, 1987

[54] ROTARY STEPPING DEVICE WITH MEMORY METAL ACTUATOR

[75] Inventor: Robert S. Jamieson, Pasadena, Calif.

[73] Assignee: The United States of America as represented by the Administrator of the National Aeronautics and Space Administration, Washington, D.C.

[21] Appl. No.: 526,739

[22] Filed: Aug. 26, 1983

[51] Int. Cl.⁴ .............................................. H02N 7/00
[52] U.S. Cl. .................................... 310/306; 337/393
[58] Field of Search ................... 310/306, 307, 37, 80;
318/116, 117; 337/393

[56] References Cited

U.S. PATENT DOCUMENTS 2,096,458 10/1937 Johnson ................................ 310/37
3,229,177 1/1966 Clarke .............................. 310/307 X
3,403,238 9/1968 Buehler et al. ...................... 337/393
4,010,458 3/1977 Stange ............................. 310/307 X Primary Examiner—Donovan F. Duggan
Attorney, Agent, or Firm—Paul F. McCaul; John R. Manning; Thomas H. Jones

[57] ABSTRACT

A rotary stepping device includes a rotatable shaft which is driven by means of a coiled spring clutch which is alternately tightened to grip and rotate the shaft and released to return it to a resting position. An actuator formed of a memory metal is used to pull the spring clutch to tighten it and rotate the shaft. The actuator is activated by heating it above its critical temperature and is returned to an elongated configuration by means of the force of the spring clutch.

11 Claims, 5 Drawing Figures

ROTARY STEPPING DEVICE WITH MEMORY METAL ACTUATOR

BACKGROUND OF THE INVENTION

1. Origin of the Invention

The invention described herein was made in the performance of work under a NASA Contract and is subject to the provisions of Section 305 of the National Aeronautics and Space Act of 1958, Public Law 85-568 (72 STAT 435; 42 USC 2457).

2. Field of the Invention

The present invention relates to the use of memory metals as actuators to produce rotary motion. Memory metals are alloys which will quickly snap from their cold-formed shapes to their stiff hot-formed shapes when a critical temperature is passed. Upon cooling they will return to the cold malleability condition, becoming quite compliant. The best known and most readily available memory metal is Nitinol, an alloy of nickel and titanium. With a temperature change of as little as 18° F., Nitinol can exert a force of as much as 60,000 psi when exerted against a resistance to changing its shape.

More particularly, the present invention relates to memory metal actuators for use in incremental motion rotary devices. Such devices will be referred to herein as "stepping motors" even though such devices may not include a motor per se.

3. Description of the Prior Art

Several prior art patents disclose actuators which employ memory metals. U.S. Pat. No. 3,725,835 to Hopkins et al. discloses an actuator which includes a pair of memory metal elements which are in opposition to one another and are independently heated in order to actuate and reset the device. Heating of the memory metal elements is accomplished by passing an electric current through them.

U.S. Pat. No. 3,922,591 to Olsen also discloses a system in which a memory metal element is heated to a critical temperature by means of an electric current. This patent discloses the use of a bias current to maintain the memory metal within its operating temperature range. U.S. Pat. No. 3,634,803 to Wilson et al. and U.S. Pat. No. 3,652,969 to Wilson et al. both disclose heating of a memory metal material by means of an electric current.

The use of memory metals is also disclosed in the following U.S. Pat. Nos.: 2,809,253 to Broekhuysen; 3,012,882 to Muldawer et al; 3,174,851 to Buehler et al; 3,403,238 to Buehler et al; 3,594,674 to Wilson; 3,594,675 to Wilson; 3,676,815 to DuRocher; 3,684,994 to Tyler; 3,703,693 to Levinn; 3,872,415 to Clarke; 3,893,005 to Jost et al; and 4,205,293 to Melton et al.

Stepping motors have been developed in the past which employ a solenoid driven spring clutch to rotate a shaft. Such a device is shown in FIG. 1. A spring clutch 10 surrounds a rotatable shaft 12 and has a fixed end 10a and a free end 10b. The free end of the spring clutch is attached to the movable slug 14a of a solenoid 14. When the solenoid is activated, the slug 14a is pulled down, thus tightening the spring clutch 10 and pulling the spring clutch through a small angle, thereby turning the output shaft 12. When power to the solenoid is removed, the solenoid flux dies and the slug 14a is lifted by the action of the spring 10. During this upstroke the spring will loosen and thus can return to its starting position without turning the shaft. Such devices have been used in servos and other systems in the past, and have been found to be reliable and capable of a high torque and very precise step. One model employs two solenoids and springs such that while one spring is relaxing, the other is tightening and turning the shaft, thereby doubling the output power and speed of the device.

SUMMARY OF THE INVENTION

The present invention is directed to a unique rotary stepping device arrangement in which a memory metal actuator element is employed as the drive unit for the motor. A memory metal element is employed to impart a drive motion to a spring clutch which is positioned about a shaft. The memory metal element is normally in its cold malleable state and is pulled into an elongated configuration by means of the spring clutch. The actuator element is hot formed into a compact configuration, and when heated above its critical temperature, it will quickly snap from its elongated condition to the hot formed shape. This action tightens the spring clutch and causes it to rotate the shaft through a small angle. As the memory metal actuator cools, it reforms to its elongated shape under the action of the spring. During this motion, the spring loosens its grip on the shaft and thus returns to its starting position without any rotation of the shaft. An efficient and simple rotary stepping device is thus provided which takes advantage of the unique properties of memory metals.

BRIEF SUMMARY OF THE DRAWINGS

The present invention will be described with reference to the accompanying drawings in which.

DESCRIPTION OF THE PREFERRED EMBODIMENT

The following description is of the best presently contemplated mode of carrying out the invention. This description is made for the purpose of illustrating the general principles of the invention and is not to be taken in a limiting sense. The scope of the invention is best determined by the appended claims.

Figure 1:
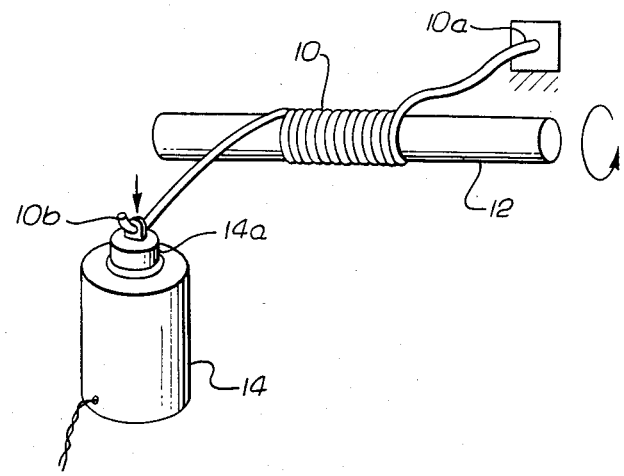
FIG. 1 is a diagrammatic perspective view of a prior art solenoid driven rotary stepping device.

FIG. 1 shows a solenoid driven rotary stepping device. In the device shown in FIG. 2, the solenoid has been replaced with an actuator 16 which is formed of a memory metal such as Nitinol. The actuator 16 has a first end 16a secured to mechanical ground and a second end 16b secured to the free end 10b of the spring clutch. The actuator 16 has been previously hot-formed into a compact configuration as illustrated in phantom in FIG. 2. When the actuator is heated above its critical temperature, it will quickly snap from the elongated configuration to the hot formed shape. This will pull the free end 10b of the spring clutch down, thus tightening the coil about the shaft 12 and rotating the shaft. When the actuator cools to a temperature below the critical temperature, the spring clutch will be released and its action will pull the now malleable actuator to the elongated configuration shown in FIG. 2. The actuator is now ready to be reheated to initiate a subsequent rotary step motion in the shaft 12.

Thus, the end of the spring clutch will alternately be pulled down by the action of the memory metal actuator and lifted up by the action of the spring returning to its initial configuration. This action will impart rotary stepping motion to the output shaft 12. As the spring returns to its initial configuration it will loosen its grip on the shaft 12 and no rotation of the shaft will occur during this resetting action.

In the preferred embodiment of the invention, the actuator 16 is heated above its critical temperature by means of a voltage source 18 which passes a current through the actuator. In addition, a continuous bias current may be provided in order to maintain the temperature of the actuator 16 at a level just below the critical temperature. In this manner, additional current pulses will quickly heat the actuator beyond its critical temperature, thus resulting in higher speed operation.

Figure 3:
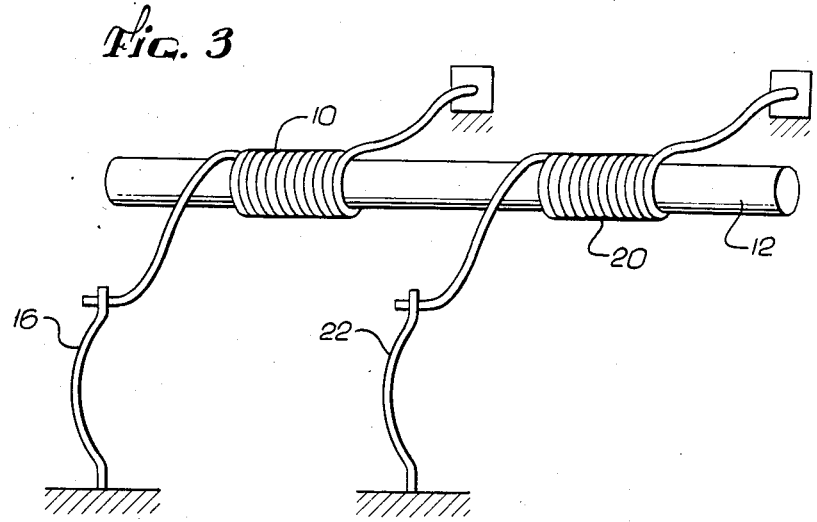
FIG. 3 is a diagrammatic perspective view of the rotary stepping device of the present invention employing dual spring clutches.

Referring to FIG. 3, a second spring clutch 20 and memory metal actuator 22 may be provided to rotate the shaft 12. In this configuration, the heating of the actuators 16 and 20 is controlled so that as the clutch 10 is tightening and rotating the shaft 12, the actuator 22 is below the critical temperature and the clutch 20 is in the process of resetting. Similarly, when the actuator 22 is energized and the clutch 20 is driving the shaft 12, the clutch 10 is in the process of resetting. This configuration doubles the output power and speed of the device.

Figure 2:
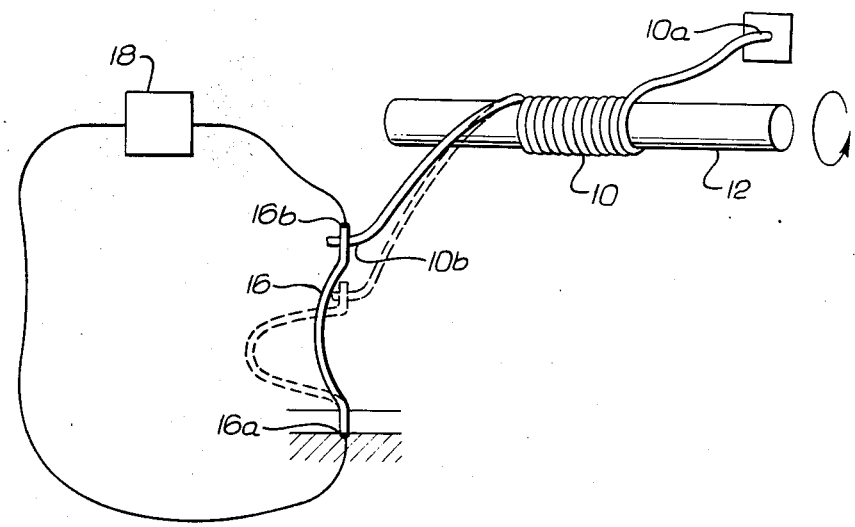
FIG. 2 is a diagrammatic perspective view of the rotary stepping device of the present invention.
Figure 4:
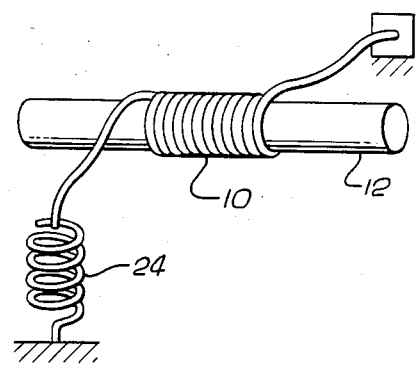
FIG. 4 is a diagrammatic perspective view of an alternate memory metal actuator element for use with the present invention.

Referring to FIG. 4, a helical memory metal actuator 24 may be employed instead of the U-shaped actuator shown in FIGS. 2 and 3. During hot forming, the coil spring would be wound tightly, as closed coils. In the cold state, the coils will be stretched apart by the action of the spring clutch 10, and will have an elongated configuration as shown in FIG. 4.

A memory metal material may also be used to form the spring clutch itself, with the coil being hot formed into a tightly coiled configuration. Thus, when heated by a current pulse passing through it, the coil will tighten and grip the shaft more tightly thereby transmitting more of the motion and force generated by the memory metal actuator to the shaft and its load. In such an instance, the spring clutch coil need not have as many turns as with a conventional coil, and its cold diameter could have a larger clearance over the shaft. This large clearance reduces the frictional load on the shaft when two coils are employed as shown in FIG. 3.

Figure 5:
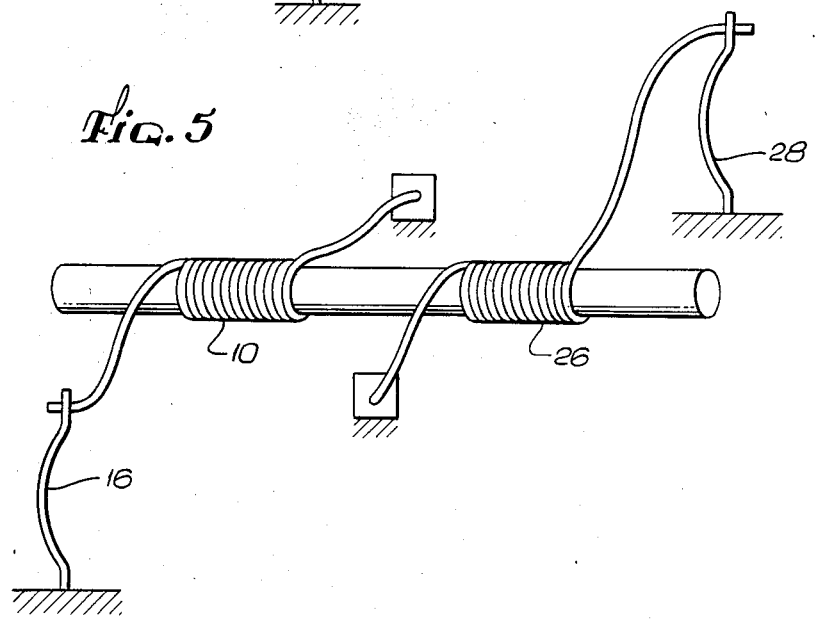
FIG. 5 is a diagrammatic perspective view of a bidirectional rotary stepping device according to the present invention.

A bidirectional stepping device may be formed by providing opposed spring clutches 10 and 26 driven by memory metal actuators 16 and 28, respectively, as shown in FIG. 5. An additional spring clutch may be provided for each direction of rotation to increase the output power and speed of the device as discussed in connection with FIG. 3.

Thus, the present invention provides a rotary stepping device which employs a memory metal actuator to drive a spring clutch to impart rotation to a shaft. The actuator can be heated above its critical temperature by means of an electric current, and the overall construction and operation of the device is extremely simple. It should be noted that various modifications can be made to the device without departing from the scope of the invention and the claims are intended to cover all such modifications.

What is claimed is:

1. A rotary stepping device comprising:
   a rotatable shaft;
   a spring clutch comprised of a coiled spring wound about the shaft, said spring having a first end which is maintained in a fixed position and a movable second end;
   an actuator element formed of a memory metal, said actuator element having a fixed end and a free end which is secured to the second end of the spring; and
   control means for successively heating the actuator element to its critical temperature to cause it to assume a hot-formed shape and pull on the second end of the spring, thereby tightening the coiled spring about the shaft and causing the shaft to rotate, wherein when the actuator element cools to a temperature below its critical temperature the spring clutch will loosen with respect to the shaft and return to its original configuration, and wherein said control means is successively operable to rotate the shaft through a plurality of incremental steps in a single direction of rotation.

2. In a rotary stepping device of the type including a rotatable shaft driven by a coil spring clutch surrounding the shaft and having a free end which is pulled to tighten the spring clutch around the shaft and rotate the shaft, the improvement comprising an actuator element formed of a memory metal, said actuator element having a fixed end and a free end secured to the free end of the spring clutch, and control means for successively heating the actuator element to its critical temperature to cause the actuator element to move to a hot-formed configuration in which the spring clutch is pulled to tighten the spring clutch and rotate the shaft, wherein when the actuator element is below its critical temperature it will be stretched to an extended configuration by the spring clutch, and wherein said control means is successively operable to rotate the shaft through a plurality of incremental steps in a single direction of rotation.

3. The stepping device of claims 1 or 2 wherein the control means comprises means for passing an electric current through the actuator element.

4. The stepping device of claim 3 wherein the control means includes means for passing a bias current through the actuator to heat it to a temperature slightly below its critical temperature, thereby minimizing the amount of additional current necessary to activate the actuator element.

5. The stepping device of claims 1 or 2 wherein the actuator element is a strip of memory metal which has been hot-formed into a substantially U-shaped configuration, wherein when the actuator element is below its critical temperature the spring clutch will stretch it to an elongated configuration.

6. The stepping device of claims 1 or 2 including a second spring clutch, second actuator element and second control means, wherein the control means for each actuator element operates such that as one spring clutch is tightening and turning the shaft the other spring clutch is relaxing.

7. The stepping device of claims 1 or 2 wherein the actuator element is a strip of memory metal which is hot-formed into a compressed helical configuration, wherein when the actuator element is below its critical temperature the spring clutch will stretch it to an elongated configuration.

8. The stepping device of claims 1 or 2 wherein the spring clutch is formed of a memory metal which is hot-formed into tight coil configuration which will securely grip the shaft when heated above its critical temperature.

9. The stepping device of claims 1 or 2 further including a second spring clutch surrounding the shaft and a second memory metal actuator coupled to actuate the second spring clutch to rotate the shaft, wherein the second spring clutch is positioned to rotate the shaft in a direction opposite to the direction of rotation imparted to the shaft by the first spring clutch.

10. A rotary stepping device comprising:
   a rotatable shaft;
   a spring clutch comprised of a coiled spring wound about the shaft, said spring having a first end which is maintained in a fixed position and a movable second end;
   an actuator element formed of a memory metal, said actuator element having a fixed end and a free end which is secured to the second end of the spring; and
   control means for sequentially:
      (a) heating the actuator element to its critical temperature to cause it to assume a hot-formed shape and pull on the second end of the spring, thereby tightening the coiled spring about the shaft and causing the shaft to rotate through a small angle in a particular direction,
      (b) allowing the actuator element to cool to a temperature below its critical temperature, thereby loosening the spring clutch with respect to the shaft and returning the spring clutch to its original configuration, and
      (c) repeating steps (a) and (b) a plurality of times to cause the shaft to be incrementally rotated a plurality of times through a small angle in the same direction.

11. In a rotary stepping device of the type including a rotatable shaft driven by a coil spring clutch surrounding the shaft and having a free end which is pulled to tighten the spring clutch around the shaft and rotate the shaft, the improvement comprising:
   an actuator element formed of a memory metal, said actuator element having a fixed end and a free end secured to the free end of the spring clutch; and
   control means for sequentially:
      (a) heating the actuator element to its critical temperature to cause the actuator element to move to a hot-formed configuration in which the spring clutch is pulled to tighten the spring clutch and rotate the shaft through a small angle in a particular direction;
      (b) allowing the actuator element to cool to a temperature below its critical temperature, wherein when the actuator element is below its critical temperature it will be stretched to an extended configuration by the spring clutch; and
      (c) repeating steps (a) and (b) a plurality of times to cause the shaft to be incrementally rotated a plurality of times through a small angle in the same direction.

* * * * *